Figure 1:
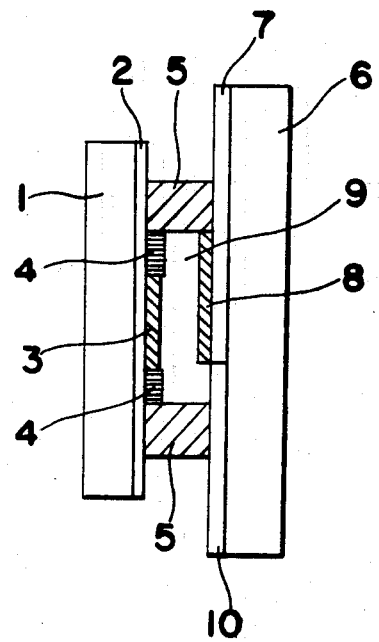

United States Patent [19]

Wada et al.

[11] 4,375,319

[45] Mar. 1, 1983

[54] ELECTROCHROMIC DISPLAY DEVICE

[75] Inventors: Tomio Wada, Nara; Hisashi Uede, Yamatokoriyama; Sadatoshi Takechi, Nara; Kohzo Yano, Tenri, all of Japan

[73] Assignee: Sharp Kabushiki Kaisha, Osaka, Japan

[21] Appl. No.: 277,656

[22] Filed: Jun. 26, 1981

Related U.S. Application Data

[63] Continuation of Ser. No. 832,959, Sep. 13, 1977, abandoned.

[30] Foreign Application Priority Data

Sep. 14, 1976 [JP] Japan ................................ 51-110470

[51] Int. Cl.³ ............................................. G02F 1/17
[52] U.S. Cl. ................................................. 350/357
[58] Field of Search ......................... 350/357; 429/111

[56] References Cited

U.S. PATENT DOCUMENTS

| | | | |
|---|---|---|---|
| 3,879,108 | 4/1975 | Berets | 350/357 |
| 3,981,560 | 9/1976 | Heyman et al. | 350/357 |
| 4,115,631 | 9/1978 | Deb | 429/111 |

*Primary Examiner*—James W. Davie
*Attorney, Agent, or Firm*—Birch, Stewart, Kolasch & Birch

[57] ABSTRACT

Electrochromic display device in which a display electrode is formed by depositing electrochromic material to a required configuration on a transparent conductive film comprising a portion contacted by the electrochromic material and a portion constituting a lead extension for connection to an external circuit, and both the conductive film lead extension and electrochromic material are covered by a layer of material which permits passage of ions between an electrolyte and the electrochromic material but is an insulator with respect to electrons, and thus colored display may be effected in a required manner but damage of the conductive film is prevented.

17 Claims, 8 Drawing Figures

ELECTROCHROMIC DISPLAY DEVICE

This application is a continuation of copending application Ser. No. 832,959, filed on Sept. 13, 1977, now abandoned.

The present invention relates to a display device of the electrochromic type taking advantage of the phenomenon of electrochromism, in which optical absorption characteristics of a material are changed by application of a suitably controlled voltage.

It is known that if certain materials, in particular transition metal oxides, are provided in the form of a thin film on an electrode and are in electrochemical connection, through an electrolyte able to contribute to ion conduction, with another electrode, when a negative voltage lower than a certain value is applied on the film, there is a flow of ions from the electrolyte to the film, which may be regarded as being in effect equivalent to a current which reduces the film, and the material of the film changes from a first state in which it effects little absorption of light in the visible region, and no marked absorption of particular wavelengths, and is therefore colorless or transparent, to a second state in which the material of the film absorbs light of particular wavelength and is colored. This phenomenon being known as electrochromism makes it possible to achieve display of different colors by use of different materials, and the materials concerned are known as electrochromic materials. For brevity below, such material is referred to as EC material. It is thought that the color effect resulting from such flow of ions into EC material is due to formation of color species in the material. If the EC material is tungsten oxide, $WO_3$, the coloring mechanism is as follows.

If the ionic charge carriers of the electrolyte are protons ($H^+$):

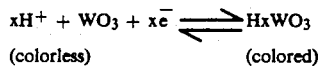

(colorless)        (colored)

If the ionic charges are carried by a metal ($M^+$):

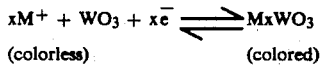

(colorless)        (colored)

For the latter type of carrier, an alkali metal is most commonly employed.

EC material shaped to define a display element may be employed in an electrochromic display device or display cell having a construction such as shown in FIG. 1, for example, which includes a transparent support or substrate 1 of glass or plastic, on which is applied a transparent conductive film 2. The film 2 may be, for example, indium oxide, $In_2O_3$, which contains stannic oxide $SnO_2$, as impurity, and is applied by vacuum evaporation process or a film of Nesa glass, e.g., $SnO_2$, contains arsenic pentoxide, $As_2O_5$, as impurity, and is applied by evaporation or spray process. Any suitable known method may be employed for obtaining the required configuration, i.e., peripheral outline of the conductive film 2, for example, a photoetching process using photoresists, or an epoxy resin screen printing process in which required portions of the film 2 are masked and remaining portions are etched. Etchant employed is normally hydrochloric acid, or other mineral acid, if the film 2 consists of $In_2O_3$, and nascent hydrogen produced by mineral acid and a metal such as zinc or aluminum, if the film 2 is Nesa glass. In all cases, the conductive film 2 is required to include a portion for support of EC material and a lead-extension portion for connection of leads to an external power supply circuit for actuation of the display device. On the conductive film 2 there is applied a film or layer 3 of EC material, which defines precisely or approximately the shape of a required display element, and which in the example shown in FIG. 1 has peripheral portions contacted by a layer 4 of insulating material. The substrate 1, conductive film 2, EC film 3, and insulator layer 4 together constitute a display electrode. The display element defined by the EC film 3 may of course be a complete display or may be a segment of a display.

The display device further comprises a substrate 6 of glass, plastic, or ceramic material which is disposed generally parallel to the substrate 1 and has applied thereon a film 7 of conductive material, suitably a noble metal. The portion of the conductive film 7 which is in the interior of the completed cell is covered by a protective layer 8, which is usually EC material such as employed for the display electrode. The substrate 6, conductive film 7, and protective layer 8 together constitute a counter-electrode.

Also on the substrate 6 there is provided a reference electrode 10 which is on a plane parallel to that of the conductive film 7 and is separated from the film 7. Between the display electrode and counter-electrode and reference electrode, there are provided seal and spacer elements 5 and electrolyte 9 is provided in the space defined between the electrodes and spacer elements 5. The display device thus constituted may be of the so-called transparent type, which permits viewal of a display from the side of the substrate 1 or side of the substrate 6 of the device, but since it is normally difficult to make the counter-electrode transparent, it is general practice to employ display devices of the so-called reflective type, in which a display constituted by the EC film 3 is seen from the side of the substrate 1 of the device against a suitable background. This background may be provided by dispersion in the electrolyte 9 of a pigment of a color contrasting with that produceable by the EC film 3.

Production of color nuclei in the EC layer 3 is effected by imposition thereon of a negative potential as noted earlier, and this is suitably effected by holding the conductive film 2 of the display electrode at ground potential and imposing on the reference electrode 10 a potential which is positive with respect to the ground, imposition of this positive potential being often referred to as the "write" charge. To terminate display by the EC film 3, a negative potential is imposed on the reference electrode 10 while the display electrode is still held at the ground potential, this negative potential being commonly termed as 'erase' charge. This results in a current flow which for the EC film 3 is an oxidizing current and results in removal from the film 3 of color nuclei.

Figure 2:
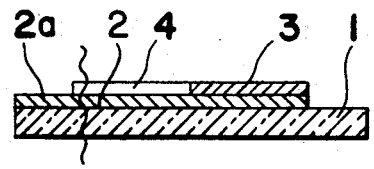
Figure 2:
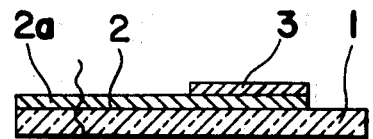
Figure 2:
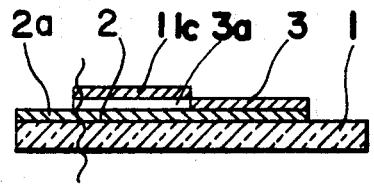
Figure 2:
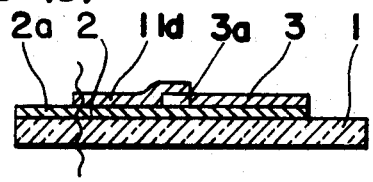
Figure 2:
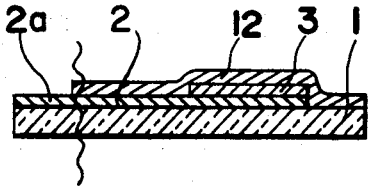

The present invention relates specifically to construction of the display electrode of an electrochromic display device such as shown in FIG. 1, and will now be described in reference to FIG. 2 showing examples of display electrode construction, FIG. 3 which is a graph illustrating protection of a conductive layer of a display electrode achieved by the means of the present invention, and FIG. 4 which shows switching times of the display device according to the present invention.

Referring to FIGS. 2(A) to 2(D) in which correspondingly numbered elements are the same as in FIG. 1, and in which portions of electrodes which are to the right of the waved line are portions which are in contact with the electrolyte in a display device, structure B shown in FIG. 2(B) is a structure such as described by Faughnan et al., in RCA Rev. 36,177(1975) and is achieved simply by applying the transparent conductive film or electrode 2 on the substrate 1, and then applying the EC film 3 to a desired configuration on the conductive film 2. With this construction, if the EC film 3, when initially applied, is close to the required display element configuration, it is possible to achieve required configurations of both the conductive film 2 and the EC film 3 in the completed display device by an etching process using a single mask for both the films 2 and 3. The structure B therefore permits precise but easy control of display element configuration, and is the simplest structure from the point of view of manufacture. In the structure B, however, the portion, referred to below as the lead-extension, 2a, of the conductive film 2 which is not covered by the EC film 3, but extends between the peripheral portion of the EC film 3 and seal elements, such as the seal elements 5 of FIG. 1, is exposed directly to the electrolyte, and may be dissolved or become discolored due to repeated oxidation and reduction thereof which occur during actuation of the display device, with the result that, after use of the display device for a comparatively short time, quality of the display deteriorates, or there is breakage of connection to an external drive circuit.

This problem can be resolved by the structure A shown in FIG. 2(A), which is the display electrode structure employed in the device shown in FIG. 1, and in which there is provided an insulating layer 4 which extends over the lead-extension 2a of the conductive film 2. Theoretically, adequate protection of the lead-extension 2a can be achieved by this construction, but in terms of practical manufacture, the structure A presents a particular problem, since it is necessary that there should be very precise match between the meeting edge portions of the insulator film 4 and EC film 3, and this is very difficult to achieve, particularly in large-scale production of display devices.

This problem of manufacture is resolved by structure C and structure D shown in FIG. 2(C) and FIG. 2(D), respectively. The principle of manufacture is basically the same for both the structures C and D, and consists of preparing the substrate 1 covered by the conductive film 2, depositing thereon a film 3 of EC material which extends over an area greater than that required to define a display element, and then defining the exact contour of the required display element by a layer 11 of insulating material such as a silicon oxide, SiOx, for example. If the EC film 3 extends completely over the lead extension 2a of the conductive film 2, as in the structure C, there is provided an insulator layer 11c which extends over the EC film portion 3a which is not required for display and which, although serving to protect the conductive film 2 is separated therefrom by the EC film 3. If the EC film 3 covers an area only slightly greater than that required for the display element, as in the structure D, there is provided an insulator layer 11d which is deposited directly on the conductive film 2 and includes a portion which overlaps peripheral portions of the EC film 3 which are not required for display purposes.

For both of the structures C and D, the conductive film 2 and EC film 3 may be deposited as single sheets and then etched to required patterns, in the same manner as for the structure B, and then the insulator layer 11 may be applied in a precise configuration by vacuum-deposition through a mask, or epoxy resin screen printing process. In both cases, there is complete protection of the conductive layer 2, and the EC film 3 in the resulting structure comprises a portion, which as indicated by the hatched portions of the drawing, is uncovered and therefore in contact with electrolyte, and a portion 3a which is not required for display, and is not contactable by the electrolyte since it underlies the insulator layer 11c.

In the structures C and D, application of a write charge produces a high concentration of color species in the main, uncovered portion of the EC film 3, but causes no production of color species in the EC film portion 3a underlying the insulator layer 11, and there is therefore a gradient, in terms of color species concentration, between the main portion of the EC film 3 and portion 3a. If an erase charge is applied immediately after the write charge, this gradient results in no changes in the EC material as a whole, but if the write charge is maintained, in order to maintain the display, the gradient results in a decision of color species from the main portion of the EC film 3 to the portion 3a. In a display device in which the insulator layer consists of epoxy resin vacuum-deposited on a transparent conductive film of $In_2O_3$, the electrolyte is a 1.0 M/l solution of lithium perchlorate 2 ethoxy ethyl acetate, and the electrical charge imposed to effect display is 10 mC/cm$^2$, to achieve a contrast ratio of 1:10 the rate of diffusion of color nuclei towards portion 3a is estimated as being of the order of 1 mm/hour. The result is that the desired quality of display fails to be achieved, because of change of the density of the display. Further, application of an erase charge is not effective in removing color species from the protected film portion 3a, and there is therefore a reverse gradient of color species concentration after application of an erase charge, resulting in reverse drift of color nuclei to the main portion of the EC film 3, which therefore becomes faintly colored even when it should be colorless, which is particularly disadvantageous when the film 3 constitutes part of a segment display.

Accordingly, an essential object of the present invention is to provide an electrochromic display device which is free from deterioration or breakage especially at a lead-extension of a display portion and can be produced by an easily controlled process.

Another important object of the present invention is to provide an electrochromic display device of the above described type in which undesirable faint coloring of the display when it should be colorless is eliminated for presenting clear and definite display.

A further object of the present invention is to provide an electrochromic display device of the above described type which is simple in construction and accurate in functioning, and can be manufactured at low cost, with substantial elimination of disadvantages inherent in the conventional electrochromic display devices.

In accomplishing these and other objects, according to the present invention, there is provided an electrochromic display device in which a display electrode is formed by depositing electrochromic material to a required configuration on a transparent conductive film comprising a portion contacted by the electrochromic material and a portion constituting a lead extension for connection to an external circuit, and both the conductive film lead extension and electrochromic material are covered by a layer of material which permits passage of ions between an electrolyte and the electrochromic material but is an insulator with respect to electrons, whereby colored display may be effected in a required manner but oxidation and discoloration of the conductive film are prevented.

Figure 3:
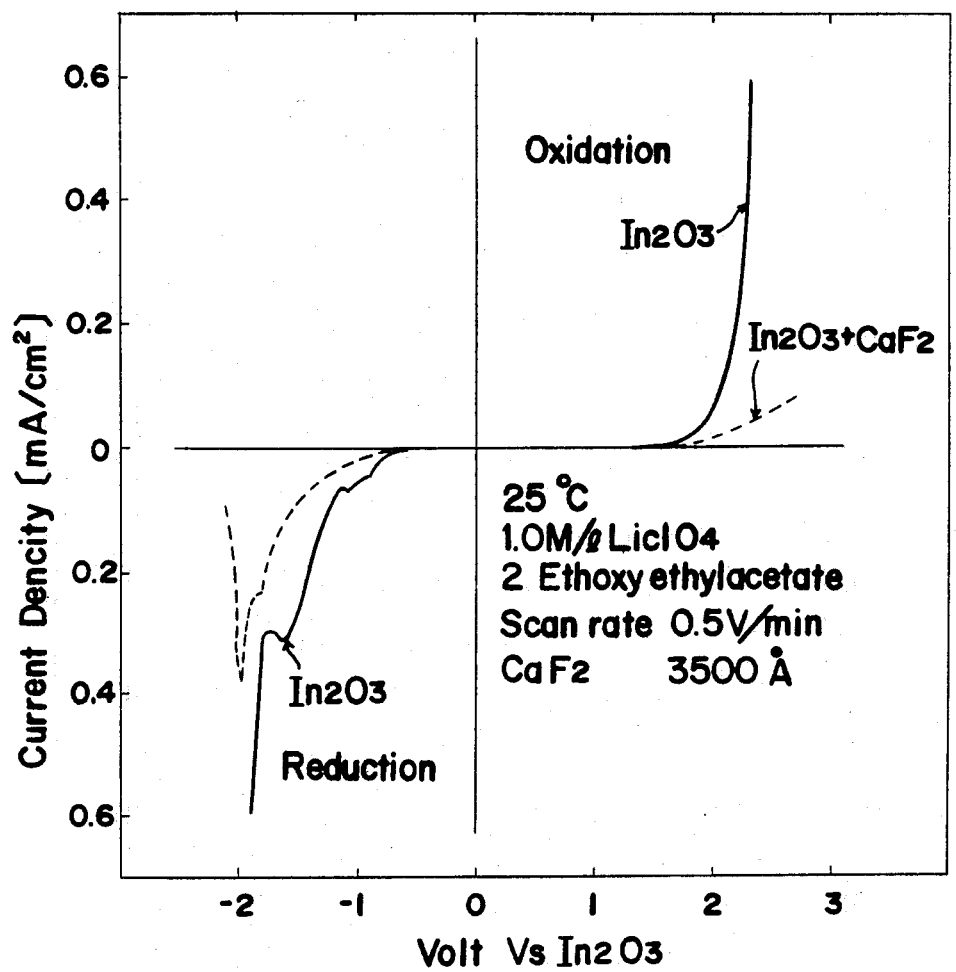
Figure 4:
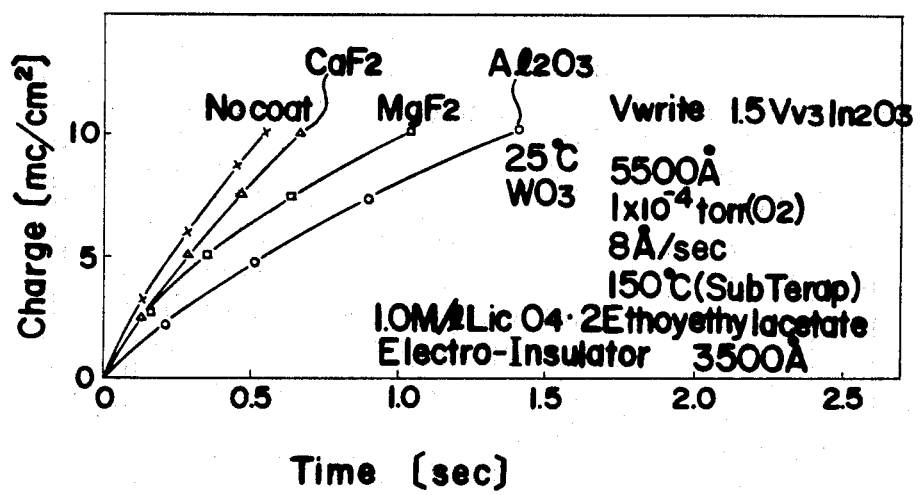

These and other objects and features of the present invention will become apparent from the following description taken in conjunction with the preferred embodiment thereof with reference to the accompanying drawings in which like parts are designated by like reference numerals;

FIG. 1 is a schematic side view, partly in section, showing a fundamental construction of a reflective type electrochromic display device which has already been referred to, FIGS. 2(A) to 2(D) are schematic side views, partly in section, showing construction of display electrodes for conventional electrochromic display devices which have also already been mentioned, FIG. 2(E) is a schematic side view, partly in section, showing a construction of a display electrode for the electrochromic display device according to the present invention, FIG. 3 is a graph explanatory of electrode reaction protection effect of an electro-insulator according to one embodiment of the present invention, and FIG. 4 is a graph showing response characteristics of the electro-insulator mentioned with reference to FIG. 3.

Referring to the drawings and particularly to FIG. 2(E), for ensuring protection of the conductive film 2, while at the same time permitting manufacture by an easily controlled process, there is provided according to the invention an electrochromic display device having a display electrode which has the structure E (FIG. 2(E)), and is produced by coating the substrate 1 with the transparent conductive film 2, forming an EC film 3 on the conductive film 2 by a method used for production of the structure B already referred to, which permits simple control of dimensions of the EC film 3, as noted earlier, and then applying on the lead-extension portion 2a of the conductive film 2 and also on the entire surface of the EC film 3 a layer 12 made of material which is an insulator with respect to electrons but allows passage of ions. The electro-insulator layer 12 preferably has a thickness in the range of form 1000 Å to 5000 Å. Examples of suitable materials for the electro-insulator layer 12 include aluminum oxide ($Al_2O_3$), chromium oxide ($Cr_2O_3$), calcium fluoride ($CaF_2$), magnesium fluoride ($MgF_2$), and titanium oxide ($TiO_2$), which may be deposited by evaporation process, and $\beta$ alumina and $\beta'$ alumina, which are known as sodium super ionic conductors and are suitably deposited by sputtering process.

To confirm that the electro-insulator 12 protects conductive film 2 without hindering electrochemical interactions between the EC film 3 and an electrolyte, tests were conducted whose results are shown in FIGS. 3 and 4. FIG. 3 plots the results of voltammetry measurements made on a display in which the electrolyte employed was a 1.0 M/l solution of $LiClO_4$ 2-ethoxy ethyl acetate and the display electrode was constituted by a typical transparent conductive film 2 of $In_2O_3$, including $SnO_2$ as impurity, and an electro-insulator layer 12 of calcium fluoride on a transparent substrate 1, which were deposited by evaporation process at a rate of 18 Å/sec, in a vacuum of $5\times10^{-5}$ torr and with substrate temperature at 100° C. In the graph of FIG. 3, the solid line curve indicates measured values for the conductive film 2 and the dashed line curve values for the protective layer 12. It is seen from FIG. 3 that the layer 12 provides good protection for the conductive film 2 up to values of write charge of the order of $-1.5$ V.

FIG. 4 plots results of tests for determining the effect of the electro-insulator layer on coloring of the EC film. The display devices employed for the tests had a construction similar to that shown in FIG. 1, and included a conventional device in which the lead-extension 2a of the conductive film 2 was uncovered, and the EC film was a $WO_3$ film 5,500 Å thick which was deposited on an $In_2O_3$ film at a rate of 8 Å/sec in a vacuum of $1\times10^{-4}$ torr ($O_2$ partial pressure) substrate temperature being 150° C., a device which was prepared in the same manner and further included an electro-insulator layer of $CaF_2$ 3,500 Å thick, a device including an electro-insulator layer a layer of $MgF_2$ 3,500 Å thick which was vacuum-deposited at a rate of 8 Å/sec in a vacuum of $5\times10^{-5}$ torr, substrate temperature being 100° C., and a device including an electro-insulator layer a layer of $Af_2O_3$ 3,500 Å thick which was vacuum-deposited at a rate of 8 Å/sec in a vacuum of $5\times10^{-5}$ torr. The electrolyte in all the test display devices was a 1.0 M/l solution of $LiClO_4$ 2-ethoxy ethyl acetate, which contained 50% by weight alumina, as a pigment constituting a white background for the display. In all cases, the reference electrode was an $In_2O_3$ electrode, electric charge was measured while a write charge of 1.5 V was applied on and maintained at the reference electrode. For all the devices contrast ratio at a wave-length of 580 m$\mu$ was 1:10 when charge density reached 10 mc/cm$^2$. Thus, the electro-insulator layer permits suitable contrast to be achieved, although it is seen from FIG. 4 that when an $MgF_2$ or $Af_2O_3$ layer employed switching time, i.e., the time to achieve contrast of 1:10 is much longer than that required in devices in which the conductive film is uncoated. For many practical purposes, however, the achieved switching times are suitably short, less than 1.5 seconds for both types of the electro-insulator layer, and for purposes requiring shorter switching times there is a possibility that the switching time can be reduced while protection of the conductive layer is maintained by altering thickness or deposition conditions of the electro-insulator layer. On the other hand, a $CaF_2$ layer prepared in the abovenoted conditions permits switching time which is very close to that of a device having an uncoated conductive film 2.

The ability of the electro-insulator layer to protect the conductive film 2 without unduly affecting electrochromic properties of display material can be thought to be due to the fact that ions may pass from the electrolyte to cause formation of color nuclei in the EC material, and although this process is accompanied by injection of electrons from the conductive film, these electrons are not able to pass the electro-insulator layer, and so risk of oxidation of the conductive film is avoided.

To further assess qualities of the electrochromic display device according to the invention, aging tests employing different types of display electrode structures and different materials for electro-insulator layers were conducted, structures and materials employed and results of tests being shown in Table 1.

TABLE 1

| Transparent Electrode | Display Electrode Structure | Electro-Insulator[1] | Reference Electrode Voltage[2] | Results |
|---|---|---|---|---|
| $In_2O_3$ | B | | ±1.5V | 3,000 cycles: brown discoloration of $In_2O_3$, formation of air bubbles |
| $In_2O_3$ | B | | +1.2V −1.5V | 100,000 cycles: brown discoloration of $In_2O_3$ |
| $In_2O_3$ | E | $MgF_2$ | +1.2V −1.5V | 1,000,000 cycles: continuing, no change |
| $In_2O_3$ | E | $Al_2O_3$ | +1.2V −1.5V | 1,000,000 cycles: continuing, no change |
| $In_2O_3$ | E | $CaF_2$ | +1.2V −1.5V | 1,000,000 cycles: continuing, no change |
| $In_2O_3$ | E | $Cr_2O_7$ | +1.2V −1.5V | 1,000,000 cycles: continuing, no change |
| $In_2O_3$ | E | $TiO_2$ | +1.2V −1.5V | 1,000,000 cycles: continuing, no change |
| $SnO_2$ | B | | ±1.2V | 100,000 cycles: dissolution of $SnO_2$, breakage of leads |

[1]Evaporation conditions
$CaF_2$, $MgF_2$, $Al_2O_3$: as described above

| | $Cr_2O_7$ | $TiO_2$ |
|---|---|---|
| Substrate temperature | 100° C. | 100° C. |
| Deposition rate | 5A/sec | 10A/sec |
| Vacuum | $1 \times 10^{-4}$ torr ($O_2$) | $1 \times 10^{-4}$ torr ($O_2$) |

[2]
+ : write 500 msec
− : erase 1 sec

*Electrolyte: 1.0 M/l $LiClO_4$ 2-ethoxy ethyl acetate
$Al_2O_3$ powder 50% by weight
Cell thickness: 1 mm It is seen from Table 1 that excellent results in terms of service life also are achieved by the arrangement of the invention.

As is clear from the foregoing description, according to the present invention, the lead-extension of the display portion is perfectly protected, while manufacturing process for the display device is markedly facilitated through simple construction, with the undesirable faint coloring of the display at the colorless state being advantageously eliminated.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A display electrode portion of an electrochromic display device comprising a display portion and including a substrate, a transparent conductive film formed on at least a portion of said substrate, an electrochromic film made of an electrochromic material and formed on at least a portion of said conductive film so that the transparent conductive film comprises a portion thereof contacted by the electrochromic material and a portion thereof forming a lead extension for connection to an external circuit, on which the electrochromic material is not formed, and a layer of insulating material covering both the conductive film of the lead extension and the electrochromic material, said layer of insulating material physically isolating the display portion from an electrolyte and acting as an insulator with respect to electrons but permitting passage of ions between the electrolyte, the electrochromic film, and the transparent conductive film of the lead extension, whereby colored display of the electrochromic film may be effected but the flow of the electrons from the transparent conductive film of the lead extension into the electrolyte are prevented so that the transparent conductive film of the lead extension is protected by said layer of insulating material.

2. The display electrode of claim 1 wherein the insulating material is at least one member selected from the group consisting of titanium oxide, magnesium fluoride, calcium fluoride, chromium oxide, aluminum oxide, aluminum perchromate and sodium super ionic conductor in the form of $\beta$ alumina or $\beta'$ alumina.

3. The display electrode of claim 1 wherein the electrochromic material is tungsten oxide.

4. The display electrode of claim 1 wherein the substrate is made of a material selected from the group consisting of glass, plastic and ceramic material.

5. The display electrode of claim 1 wherein the conductive film is indium oxide which contains stannic oxide as an impurity.

6. The display electrode of claim 1 wherein the conductive film is Nesa glass which contains arsenic pentoxide as an impurity.

7. The display electrode of claim 1 wherein the layer of insulating material has a thickness in the range of from 1000 Å to 5000 Å.

8. A display electrode portion of an electrochromic display device comprising a transparent conductive film on a transparent substrate; an electrochromic film made of an electrochromic material and formed on at least a portion of said conductive film so that a first portion of said transparent conductive film is in contact with said electrochromic material while a second portion of said transparent conductive film forms a lead extension for connection to an external circuit on which said electrochromic material has not been formed; an electrolyte; and a layer of insulating material covering the entire conductive film portion forming the lead extension as well as completely covering, including the edges, said electrochromic film and acting as an insulator with respect to electrons but permitting passage of ions between the electrolyte, the electrochromic film and the transparent conductive film, whereby coloration of said electrochromic film is effected when said transparent conductive film is exposed to negative potential.

9. The display electrode portion of claim 8 wherein said insulating layer comprises at least one material selected from the group consisting of aluminum oxide, chromium oxide, titanium oxide, magnesium fluoride, calcium fluoride, and a superionic conductor in the form of a $\beta$-aluminum oxide or $\beta'$-aluminum oxide.

10. The display electrode portion of claim 8 wherein said insulating layer has a thickness in the range of from 100 to 500 nm.

11. The display electrode portion according to claims 8, 9 or 10 wherein said insulating layer is formed by an evaporation process or a sputtering process.

12. An electrochromic display system comprising:
an electrochromic display device comprising;
  a display electrode portion;
  a counter electrode portion;
  an electrolyte positioned between said display electrode and said counter electrode portions;
  said display electrode portion comprising a display portion and including a substrate, a transparent conductive film formed on at least a portion of said substrate, an electrochromic film made of an electrochromic material and formed on at least a portion of said conductive film so that the transparent conductive film comprises a portion thereof contacted by the electrochromic material and a portion thereof forming a lead extension for connection to an external circuit, on which the electrochromic material is not formed, and a layer of insulating material covering both the conductive film of the lead extension and the electrochromic material, said layer of insulating material physically isolating the display portion from an electrolyte and acting as an insulator with respect to electrons but permitting passage of ions between the electrolyte, the electrochromic film, and the transparent conductive film of the lead extension, whereby colored display of the electrochromic film may be effected but the flow of the electrons from the transparent conductive film of the lead extension into the electrolyte are prevented so that the transparent conductive film of the lead extension is protected by said layer of insulating material; and, means for imposing a voltage across said electrodes to actuate said device.

13. The electrochromic display system of claim 12 wherein the insulating material is at least one member selected from the group consisting of titanium oxide, magnesium fluoride, calcium fluoride, chromium oxide, aluminum oxide, aluminum perchromate and sodium super ionic conductor in the form of $\beta$ alumina or $\beta'$ alumina.

14. The electrochromic system of claim 12 wherein the electrochromic material is tungsten oxide.

15. The electrochromic display system of claim 12 wherein the substrate is made of a material selected from the group consisting of glass, plastic and ceramic material.

16. The electrochromic display system of claim 12 wherein the conductive film is indium oxide which contains stannic oxide as an impurity.

17. The electrochromic display system of claim 12 wherein the layer of insulating material has a thickness in the range of from 1000 Å to 5000 Å.

* * * * *